(12) United States Patent
Huang-Fu et al.

(10) Patent No.: US 11,153,797 B2
(45) Date of Patent: Oct. 19, 2021

(54) QUALITY OF SERVICE RULE MANAGEMENT IN 5G

(71) Applicant: MEDIATEK INC., Hsin-Chu (TW)

(72) Inventors: Chien-Chun Huang-Fu, Hsin-Chu (TW); Po-Ying Chuang, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 96 days.

(21) Appl. No.: 16/366,106

(22) Filed: Mar. 27, 2019

(65) Prior Publication Data

US 2019/0313289 A1 Oct. 10, 2019

Related U.S. Application Data

(60) Provisional application No. 62/655,137, filed on Apr. 9, 2018.

(51) Int. Cl.
*H04W 36/14* (2009.01)
*H04W 36/00* (2009.01)
(Continued)

(52) U.S. Cl.
CPC ......... *H04W 36/14* (2013.01); *H04L 47/2441* (2013.01); *H04L 47/2491* (2013.01);
(Continued)

(58) Field of Classification Search
CPC ..... H04W 36/14; H04W 24/02; H04W 76/38; H04W 36/0011; H04W 28/24;
(Continued)

(56) References Cited

U.S. PATENT DOCUMENTS

2005/0080754 A1 4/2005 Kashlwabara et al.
2008/0195511 A1 8/2008 Zhang ............... 705/30
(Continued)

FOREIGN PATENT DOCUMENTS

CN 106332187 A 6/2015
CN 107580371 A 7/2016
(Continued)

OTHER PUBLICATIONS

Samsung, TS 23.502—Update 4.2.2.2 General Registration, SA WG2 Meeting #S2-121, S2-173269, May 15-19, 2017, Hangzhou, China (Year: 2014).*
(Continued)

*Primary Examiner* — Mounir Moutaouakil
(74) *Attorney, Agent, or Firm* — Imperium Patent Works; Zheng Jin (57) ABSTRACT

A method of managing default QoS rules for PDU session is proposed. A PDU session defines the association between the UE and the data network that provides a PDU connectivity service. Each PDU session is identified by a PDU session ID, and may include multiple QoS flows and QoS rules. There can be more than one QoS rule associated with the same QoS flow. A default QoS rule is required to be sent to the UE for every PDU session establishment and it is associated with a QoS flow. Within a PDU session, there should be one and only one default QoS rule. In one novel aspect, UE behavior and error handling for proper QoS rule management is defined for PDU session establishment and modification procedures to enforce the one and only one default QoS rule policy.

18 Claims, 5 Drawing Sheets

(51) Int. Cl.

| | | |
|---|---|---|
| *H04L 29/08* | (2006.01) | |
| *H04W 24/02* | (2009.01) | |
| *H04W 76/38* | (2018.01) | |
| *H04W 28/24* | (2009.01) | |
| *H04W 60/06* | (2009.01) | |
| *H04L 12/851* | (2013.01) | |
| *H04L 12/857* | (2013.01) | |
| *H04L 12/863* | (2013.01) | |
| *H04L 29/06* | (2006.01) | |
| *H04W 28/02* | (2009.01) | |
| *H04W 88/02* | (2009.01) | |
| *H04W 84/04* | (2009.01) | |

(52) U.S. Cl.
CPC ........ *H04L 47/6295* (2013.01); *H04L 67/141* (2013.01); *H04L 67/143* (2013.01); *H04L 69/22* (2013.01); *H04W 24/02* (2013.01); *H04W 28/0268* (2013.01); *H04W 28/24* (2013.01); *H04W 36/0011* (2013.01); *H04W 36/0033* (2013.01); *H04W 60/06* (2013.01); *H04W 76/38* (2018.02); *H04W 84/042* (2013.01); *H04W 88/02* (2013.01)

(58) Field of Classification Search
CPC ............. H04W 60/06; H04W 28/0268; H04W 36/0033; H04W 88/02; H04W 84/042; H04W 36/0022; H04L 67/141; H04L 67/143; H04L 47/2441; H04L 47/2491; H04L 47/6295; H04L 69/22
See application file for complete search history.

(56) References Cited

U.S. PATENT DOCUMENTS

| | | | |
|---|---|---|---|
| 2010/0217855 A1 | 8/2010 | Przybysz et al. ............. | 709/223 |
| 2011/0310737 A1 | 12/2011 | Klingenbrunn | |
| 2012/0147767 A1 | 6/2012 | Yang et al. .................... | 370/252 |
| 2012/0196566 A1 | 8/2012 | Lee et al. ....................... | 455/408 |
| 2013/0044592 A1 | 2/2013 | Kim et al. ..................... | 370/229 |
| 2016/0119773 A1 | 4/2016 | Xu et al. ..................... | 455/432.2 |
| 2016/0212792 A1 | 7/2016 | Chang | |
| 2017/0006494 A1 | 1/2017 | Wang et al. .................. | 370/236 |
| 2017/0289046 A1 | 10/2017 | Faccin et al. | |
| 2018/0048537 A1 | 2/2018 | Gaikwad et al. ....... | H04L 12/24 |
| 2018/0070288 A1 | 3/2018 | Kim et al. | |
| 2018/0198867 A1* | 7/2018 | Dao ...................... | H04W 76/30 |
| 2018/0234876 A1 | 8/2018 | Jheng et al. | |
| 2018/0270695 A1 | 9/2018 | Bergstrom et al. | |
| 2018/0376445 A1* | 12/2018 | Yoon ...................... | H04W 76/30 |
| 2019/0116518 A1 | 4/2019 | Stojanovski et al. | |
| 2019/0159059 A1 | 5/2019 | Jheng et al. | |
| 2019/0200264 A1* | 6/2019 | Kim .................. | H04W 36/0033 |
| 2019/0239280 A1* | 8/2019 | Li .......................... | H04W 76/34 |
| 2019/0253917 A1 | 8/2019 | Dao | |
| 2019/0254118 A1 | 8/2019 | Dao et al. | |
| 2019/0261211 A1* | 8/2019 | Wu ....................... | H04W 76/20 |
| 2019/0349803 A1 | 11/2019 | Byun et al. | |
| 2019/0357118 A1* | 11/2019 | Kim ...................... | H04W 80/10 |
| 2019/0357129 A1* | 11/2019 | Park ....................... | H04W 60/00 |
| 2019/0394830 A1 | 12/2019 | Mildh et al. .......... | H04W 76/38 |
| 2020/0037197 A1 | 1/2020 | Cho et al. | |
| 2020/0037386 A1 | 1/2020 | Park et al. | |
| 2020/0077315 A1 | 3/2020 | Jinn et al. | |
| 2020/0100147 A1* | 3/2020 | Youn ................. | H04W 36/0058 |
| 2020/0145884 A1 | 5/2020 | Guo | |
| 2020/0187043 A1 | 6/2020 | Xin et al. | |
| 2020/0260336 A1 | 8/2020 | Wu et al. | |
| 2020/0275302 A1 | 8/2020 | Youn et al. ........... | H04W 28/02 |
| 2020/0280562 A1* | 9/2020 | Salkintzis ............ | H04L 65/4084 |
| 2020/0374352 A1 | 11/2020 | Ge et al. ................. | H04L 29/08 |
| 2021/0014157 A1 | 1/2021 | Zhou ..................... | H04L 12/725 |
| 2021/0022099 A1 | 1/2021 | Kumar et al. ........ | H04W 60/04 |

FOREIGN PATENT DOCUMENTS

| | | |
|---|---|---|
| CN | 107690161 A | 8/2016 |
| CN | 107018542 A | 3/2017 |
| WO | WO2018059689 A1 | 9/2016 |

OTHER PUBLICATIONS

International Search Report and Written Opinion of International Search Authority for PCT/CN2019/081864 dated Jul. 1, 2019 (9 pages).
3GPP TR 24.890 V15.1.0 (Mar. 2018), 3rd Generation Partnership Project; Technical Specification Group Core Network and Terminals; 5G System—Phase 1; CT WG1 Aspects, (Release 15) *section 9.5.6, sections 12.4*.
S2-175526 SA WG2 Meeting #122 BIS, Samsung, "update on PDU session handling for AS and NAS QoS", Sophia Antipolis, France, Aug. 21-25, 2017 (11 pages).
S2-177432 SA WG2 Meeting #S2-123, Samsung, "TS 23.501: PDU session reachability management", Ljubljana, Slovenia, Oct. 23-27, 2017 (7 pages).
International Search Report and Written Opinion of International Search Authority for PCT/CN2019/081866 dated Jun. 27, 2019 (9 pages).
3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *sections 6.2.5, sections 8.3*.
USPTO, office action for the related U.S. Appl. No. 16/366,125 dated Apr. 2, 2020 (16 pages).
3GPP TS 24.501 V0.2.2 (Dec. 2017), 3rd Generation Partnership Project; Technical Specification Group Core Network and Terminals; Non-Access-Stratum (NAS) protocol for 5G System (5GS); State 3 (Release 15) *p. 2, 84-88, and 128-138*.
International Search Report and Written Opinion of International Search Authority for PCT/CN2019/094339 dated Sep. 27, 2019 (10 pages).
C1-184614 3GPP TSG-CT WG1 Meeting #11bis, MediaTek Inc., "Exception handling in QoS operation", Sophia-Antipolis, France, Jul. 9-13, 2018 (7 pages) *sections 6.3.2.4*.
C1-182457 3GPP TSG-CT WG1 Meeting #110, Huawei et al., "Encoding of Match All Packet Filter", Kunming, P.R. of China, Apr., 16-20, 2018 (12 pages) *sections 6.2.5.1.1*, *sections 9.8.4. 7*.
Taiwan IPO, office action for the TW patent application 108110866 (no English translation is available) dated Mar. 23, 2020 (10 pages).
3GPP TR 24.890, "3rd Generation Partnership Project; Technical Specification Group Core Network and Terminals;; 5G System—Phase 1; CT WG1 Aspects (Release 15)," V15.1.0, Mar. 2018 *sections 9.5.3.2, 9.5.5.2, 9.5.6.2, 9.5.6.4, 12.4.1.1.2, Fig. 9.5.5.2.1, Fig. 9.5.6.2.1*.
3GPP SA WG2 Meeting #124 (S2-178255), Nokia et al., "OI #18 23.502;"(NAS SM; split) + Correcting information flows in § 4. (PDU session related), Reno, NV. USA, Nov. 27-Dec. 1, 2017 *sections 4.3.3.2, Fig. 4.3.3.2-1*.
3GPP TS 23.502, "3rd Generation Partnership Project; Technical Specification Group Services and System Aspects; Procedures for the 5G System; Stage 2 (Release 15)", V15.1.0, Mar. 2018 *section 4.3.3.2*.
Taiwan IPO, office action for the TW patent application 108110864 (no English translation is available) dated Jun. 22, 2020 (9 pages).
3GPP TS 24.501 V1.0.0 (Mar. 2018) 3rd Generation Partnership project; Technical Specification Group Core Network and Terminals; Non-Access-Stratum(NAS) protocol for 5G System (5GS); Stage 3 (Release 15), *section 5.4.4.3, 6.2.3, 6.2.5.1.1.2, 6.4.1.1, 6.4.1.2, 6.4.1.3, 6.4.3.2*.
S2-180421 SA WG2 Meeting #S2-125, Ericsson, "Default QoS Rule discussion", Gothenburg, Sweden, Jan. 22-26, 2018 (4 pages) *section 1, 2.1*.
Taiwan IPO, office action for the TW patent application 108127877 (no English translation is available) dated May 8, 2020 (6 pages).

(56) References Cited

OTHER PUBLICATIONS

C1-184425 3GPP TSG-CT WG1 Meeting #111 bis, MediaTek Inc., "Exception handling in QoS operation", Sophia-Antipolis, France, Jul. 9-13, 2018 (8 pages) *pp. 1-5*.

C1-184614 3GPP TSG-Ct WG1 Meeting #111 bis, MediaTek Inc., "Exception handling in QoS operation", Sophia-Antipolis, France, Jul. 9-13, 2018 (7 pages).

USPTO, office action for related U.S. Appl. No. 16/366,125 dated Oct. 19, 2020 (18 pages).

USPTO, office action for related U.S. Appl. No. 16/525,852 dated Sep. 28, 2020 (19 pages).

U.S. Appl. No. 16/525,852 OA reference C1-183815, 3GPP TSG-CT WG1 Meeting #111, Ericsson et al., "5G QoS—restructuring QoS rules IE", Osaka, Japan, May 21-25, 2018 (25 pages).

USPTO, notice of allowance for related U.S. Appl. No. 16/458,523 dated Feb. 4, 2021 (14 pages).

C1-185828 3GPP TSG-CT WG1 Meeting #112, Qualcomm Incorporated et al., "PDU Session Release due to Semantic or Syntactical Errors", West Palm Beach, FL., USA dated Aug. 20-24, 2018 (10 pages).

3GPP TS 24.501 V15.1.0 (Sep. 2018) 3rd Generation Partnership project; Technical Specification Group Core Network and Terminals; Non-Access-Stratum (NAS) protocol for 5G System (5GS); Stage 3 (Release 15).

3GPP TS 23.501 V1.0.0 (Jun. 2017), 3rd Generation Partnership Project; Technical Specification Group Services and System Aspects; System Architecture for the 5G System; Stage 2 (Release 15).

USPTO, notice of allowance for related U.S. Appl. No. 16/525,852 dated Feb. 24, 2021 (12 pages).

USPTO, Office Action for related U.S. Appl. No. 16/366,125 dated Jun. 10, 2021.

\* cited by examiner

QUALITY OF SERVICE RULE MANAGEMENT IN 5G

CROSS REFERENCE TO RELATED APPLICATIONS

This application claims priority under 35 U.S.C. § 119 from U.S. Provisional Application No. 62/655,137, entitled "5GSM Enhancement on Interworking", filed on Apr. 9, 2018, the subject matter of which is incorporated herein by reference.

TECHNICAL FIELD

The disclosed embodiments relate generally to wireless communication, and, more particularly, to method of managing Quality of Service (QoS) rules in 5G new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LTE EPS bearer or to the same 5G QoS flow receive the same level of packet forwarding treatment (e.g., scheduling policy, queue management policy, rat, shaping policy, RLC configuration etc.) Providing different QoS forwarding treatment requires separate 5G QoS flow. Each QoS flow may include multiple QoS rules consisting of QoS profile, packet filters, and precedence order. QoS profile includes QoS parameters and QoS marking. Packet filter is used for binding a QoS flow to a specific QoS marking. Precedence order represents the priority to adapt a QoS rule to a QoS flow. UE performs the classification and marking of uplink (UL) User Plane traffic, i.e., the association of UL traffic to QoS flows based on QoS rules.

In 5G, PDU session establishment is a parallel procedure of PDN connection procedure in 4G. A PDU session defines the association between the UL and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow.

Within a PDU session, there should be one and only one default QoS rule. However, the network may send multiple QoS rules to UE as the default QoS rule, the network may want to delete the default QoS rule, and the network may want to modify the default QoS rule. It is thus desirable to define the UE behavior and error handling for proper QoS rule management.

SUMMARY

A method of managing default QoS rules for PDU session is proposed. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule. UE behavior and error handling for proper QoS rule management defined for PDU session establishment and modification procedures to enforce the one and only one default QoS rule policy.

In one embodiment, a UE transmits a protocol data unit (PDU) session establishment request in a mobile communication network. The UE receives a PDU session establishment accept from the network. The PDU session establishment accept indicates to the UE to establish the PDU session and to create one or more QoS flows with one or more QoS rules. The UE releases the PDU session when the UE determines that more than one QoS rules are set by the network to be a default QoS rule for the PDU session.

In another embodiment, a UE establishes a protocol data unit (PDU) session in a mobile communication network. The PDU session is associated with a default Quality of Service (QoS) rule. The UE receives a PDU session modification command from the network. The PDU session modification command comprises commands for modifying the default QoS rule of the PDU session. The UE determines whether the PDU session modification command causes a conflict for a default QoS rule policy. The UE rejects the PDU session modification command or releasing the PDU session upon determining the conflict for the default QoS rule policy. In one example, the PDU session modification command is for the UE to add another QoS rule as the default QoS rule. The UE rejects the PDU session modification command by sending a PDU session modification command reject message with an error code. In another example, the PDU session modification command is for the UE to delete the default QoS rule, to delete all packet filters within the default QoS rule, or to change the DQR setting. The UE release the PDU session by sending a PDU session release request.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
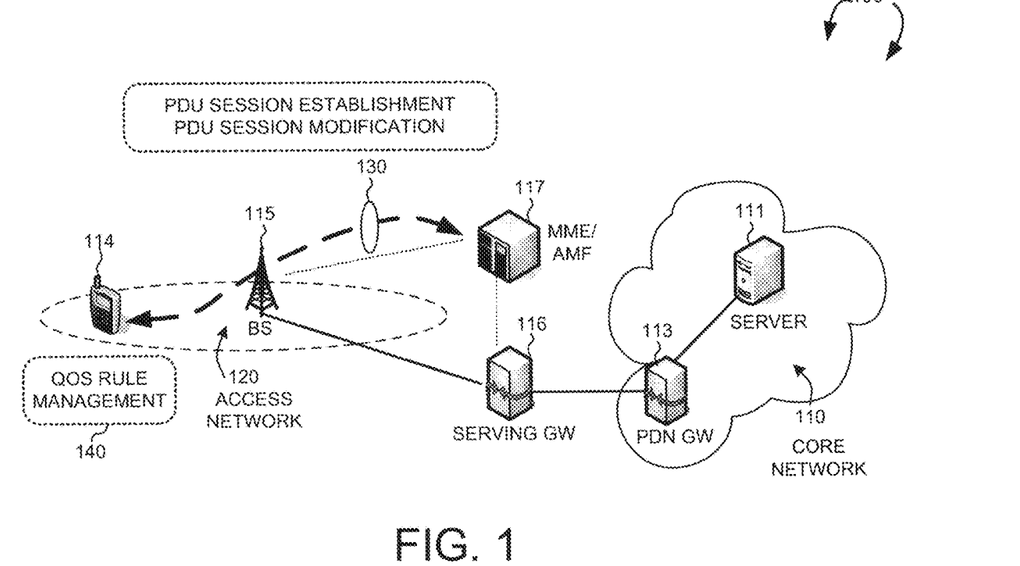
FIG. 1 illustrates an exemplary EPS/5GS network supporting Quality of Service (QoS) rule management in accordance with one novel aspect.

FIG. 1 illustrates an exemplary 4G LTE or 5G new radio (NR) 100 network supporting Quality of Service (QoS) rule management in accordance with one novel aspect. LTE/NR network 100 comprises application server 111 that provides various services by communicating with a plurality of user equipments (UEs) including UE 114. In the example of FIG. 1, application server 111 and a packet data network gateway (PDN GW or P-GW) 113 belong to part of a core network CN 110. UE 114 and its serving base station BS 115 belong to part of a radio access network RAN 120. RAN 120 provides radio access for UE 114 via a radio access technology (RAT). Application server 111 communicates with UE 114 through PDN GW 113, serving GW 116, and BS 115. A mobility management entity (MME) or an access and mobility management function (AMF) 117 communicates with BS 115, serving GW 116 and PDN GW 113 for access and mobility management of wireless access devices in LTE/NR network 100. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

EPS and 5GS networks are packet-switched (PS) Internet Protocol (IP) networks. This means that the networks deliver all data traffic in IP rackets, and provide users with Always-On IP Connectivity. When UE joins an EPS/5GS network, a Packet Data Network (PDN) address (i.e., the one that can be used on the PDN) is assigned to the UE for its connection to the PDN. EPS calls the UE's "IP access connection" an evolved packet system (EPS) bearer, which is a connection between the UE and the P-GW. The P-GW is the default gateway for the UE's IP access. EPS has defined a Default EPS Bearer to provide the IP Connectivity that is Always-On.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow.

Within a PDU session, there should be one and only one default QoS rule. However, the network may send multiple QoS rules to UE as the default QoS rule, the network may want to delete the default QoS rule, and the network may want to modify the default QoS rule. In accordance with one novel aspect, UE behavior and error handling for proper QoS rule management is defined for PDU session establishment procedure and for PDU session modification procedure. In the example of FIG. 1, UE 114 performs PDU session establishment procedure or PDU session modification procedure with the network over non-access stratum (NAS) layer signaling 130. During the PDU session establishment or modification, UE 114 performs QoS rule management as depicted by 140. In a first example, UE 114 rejects a PDU session modification command if a new QoS rule is to be added as a default QoS rule. In a second example, UE 114 releases a newly established PDU session if more than one QoS rules are to be set as a default QoS rule for the PDU session. In a third example, UE 114 releases an existing PDU session if a default QoS rule of the PDU session is to be deleted by a PDU session modification command.

Figure 2:
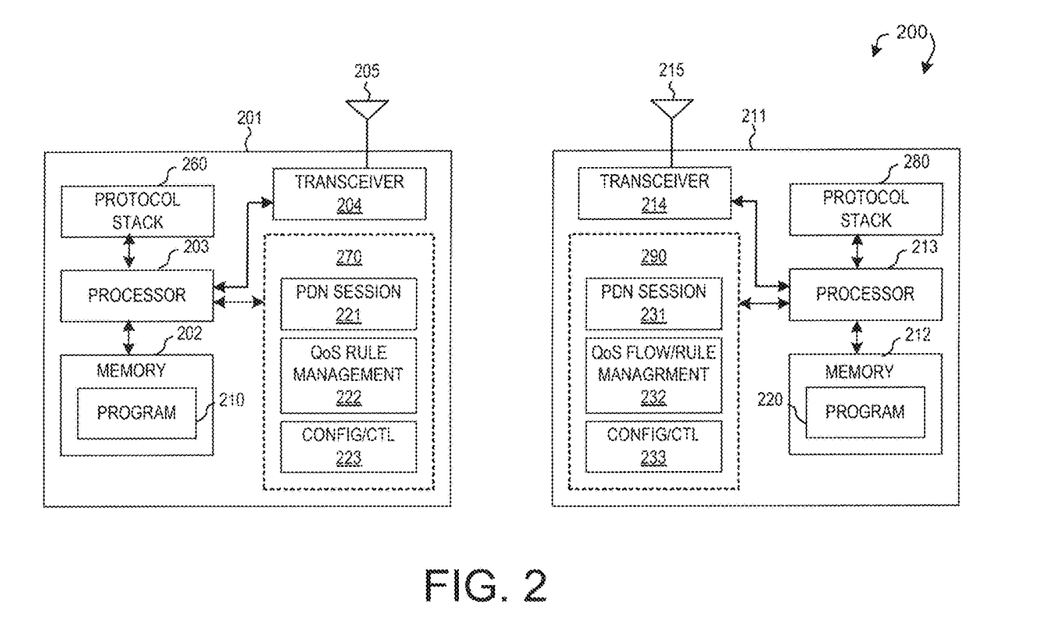
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS flow and rule management circuit 232 creates, modifies, and deletes QoS flows and QoS rules for UE. Configuration and control circuit 233 provides different parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS rule management circuit 222 that determines any conflict of the default QoS rules and handles QoS rule management, a config and control circuit 223 that handles configuration and control parameters.

Figure 3:
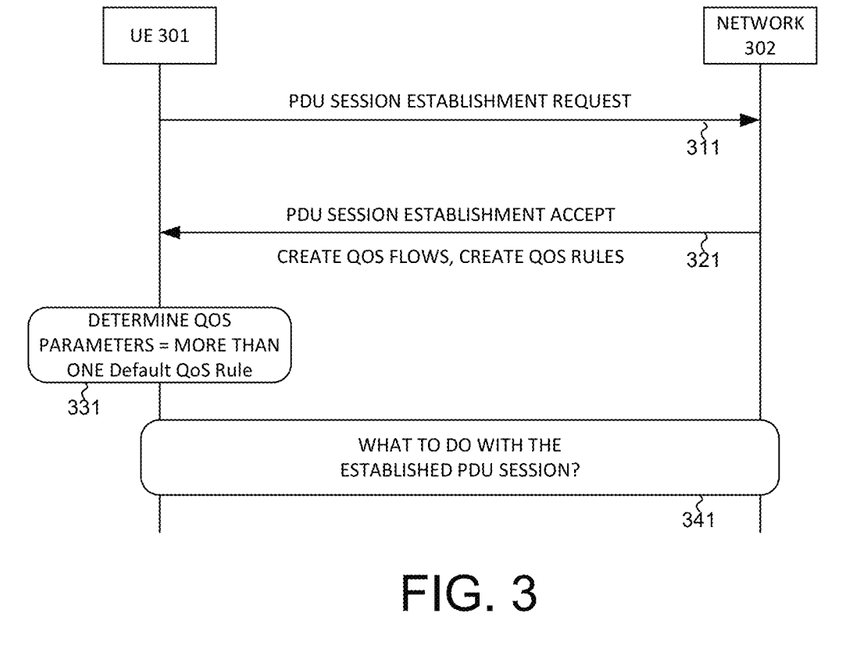
FIG. 3 illustrates a first embodiment of QoS rule management for PDU session establishment procedure in accordance with one novel aspect.

FIG. 3 illustrates a first embodiment of QoS rule management for PDU session establishment procedure in accordance with one novel aspect. In step 311, UE 301 transmits a PDN session establishment request to data network 302. A PDU session is defined as an association between the UE and the data network that provides a PDU connectivity service. In step 321, UE 301 receives a PDN session establishment accept from the network. The accept message comprises instructions for UE 301 to create one or more QoS flows and to create one or more QoS rules for the PDN session. In 5G networks, all types of traffic mapped to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order. UE performs the classification and marking of uplink (UL) User Plane traffic, i.e., the association of UL traffic to QoS flows based on QoS rules.

Each PDU session is identified by a PDU session ID, and may include multiple QoS flows and QoS rules. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. When establishing the PDU session and creating the different QoS flows and QoS rules, each QoS rule has a default QoS rule (DQR) indication indicating whether "this QoS rule is the default QoS rule". Within a PDU session, there should be one and only one default QoS rule.

However, in step 321, UE 301 may receive multiple QoS rules with DQR indication set to "the QoS rule is the default QoS rule" for the PDU session, which creates a conflict on the default QoS rule policy there should be one and only one default QoS rule for each PDU session. In step 331, UE 301 evaluates the PDU session establishment accept message and determines whether the network has indicated to the UE to create multiple default QoS rules. If there is no conflict, then the established PDU session is good. Otherwise, if there is conflict for default QoS rule policy and multiple default QoS rules are to be created for the PDU session, then in step 341, UE 301 needs to decide what to do with the established PDU session. For example, UE 301 may establish and then release the PDU session, or ignore the PDU session establishment and locally release the PDU session, or send a 5GSM message to the network with a proper cause, e.g., PDU #N DRQ mismatch, or PDU #N DQR error.

Figure 4:
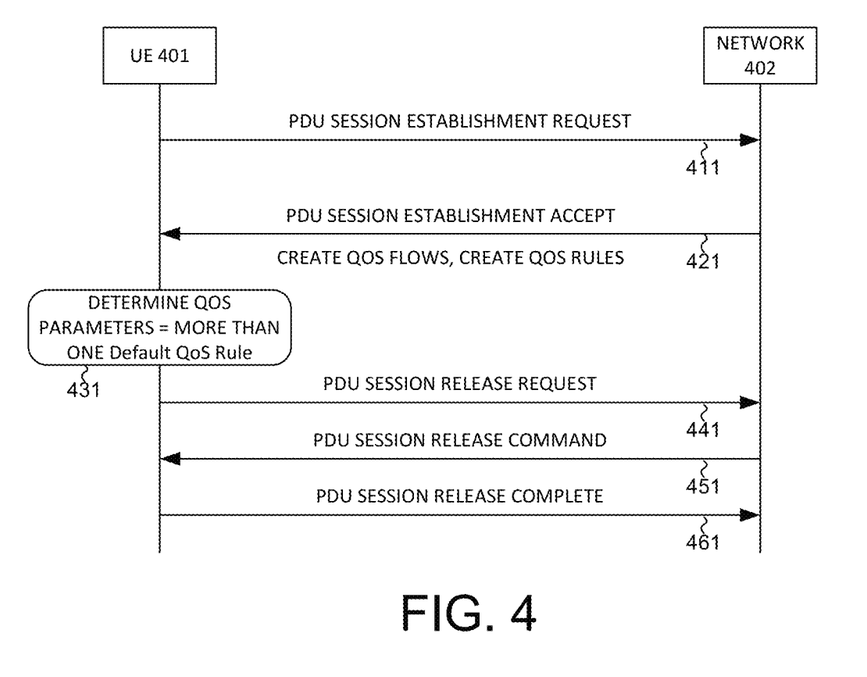
FIG. 4 illustrates a second embodiment of QoS rule management for PDU session establishment procedure in accordance with one novel aspect.

FIG. 4 illustrates a second embodiment of QoS rule management for PDU session establishment procedure in accordance with one novel aspect. For the PDU session establishment procedure, steps 411-431 of FIG. 4 are similar to steps 311-331 of FIG. 3. In step 431, UE 401 determines that data network 402 has indicated to the UE to create multiple default QoS rules for the PDU session, which creates a conflict for the default QoS rue policy. In the embodiment of FIG. 4, UE 401 releases the established PDU session explicitly to resolve such conflict. In step 441, UE 401 sends a PDU session release request to the network. hi step 451, UE 401 receives a PDU session release command from the network. in step 461, UE releases the PDU session and confirms the release by sending a PDU session release complete to the network. Note that the PDU session can be released implicitly, e.g., released locally within the UE. Optionally the UE may initiate a registration update procedure (e.g., by sending a registration request message) to the network for PDU session status synchronization.

Figure 5:
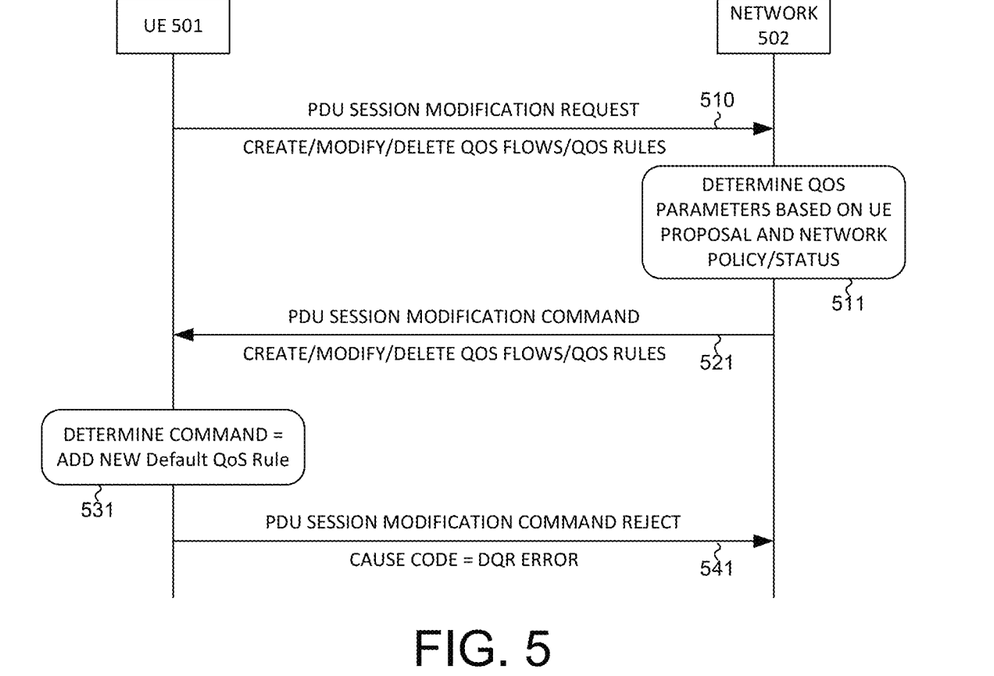
FIG. 5 illustrates a first embodiment of QoS rule management for PDU session modification procedure for adding default QoS rule in accordance with one novel aspect.

FIG. 5 illustrates a first embodiment of QoS rule management for PDU session modification procedure for adding default QoS rule in accordance with one novel aspect. In step 510, UE 501 sends a PDU session modification request to data network 502. The PDU session modification request comprises UE proposals for creating, modifying, or deleting one or more QoS flows and/or one or more QoS rules. In step 511, network 502 determines QoS parameters based on the UE proposal and based on network policy and status. In step 521, network 502 sends a PDU session modification command to UE 501. In the embodiment of FIG. 5, the PDU session modification command comprises one or more new QoS rules with DQR indication set to "the QoS rule is the default QoS rule". In another embodiment of FIG. 5, the PDU session modification command comprises modifying the DQR indication of an existing QoS rule from "the QoS rule is not the default QoS rule" to "the QoS rule is the default QoS rule". In step 531, upon receive the PDU session modification command, UE 501 evaluates the command and checks whether such command causes any conflict of the default QoS rule policy. When UE determines the command carries a new QoS rule with the DQR indication set to "the QoS rule is the default QoS rule" or modifying the DQR indication of an existing QoS rule from "the QoS rule is not the default QoS rule" to "the QoS rule is the default QoS rule", UE knows that the command will create more than one default QoS rules and thus causes conflict. In step 541, UE 501 send a PDU session modification command reject back to the network, with a proper cause, e.g., semantic error in the QoS operation, DQR mismatch or DQR error to resolve the DQR conflict. In another embodiment of step 541, UE 501 send a PDU session release request to the network with a proper cause, e.g., semantic error in the QoS operation.

Figure 6:
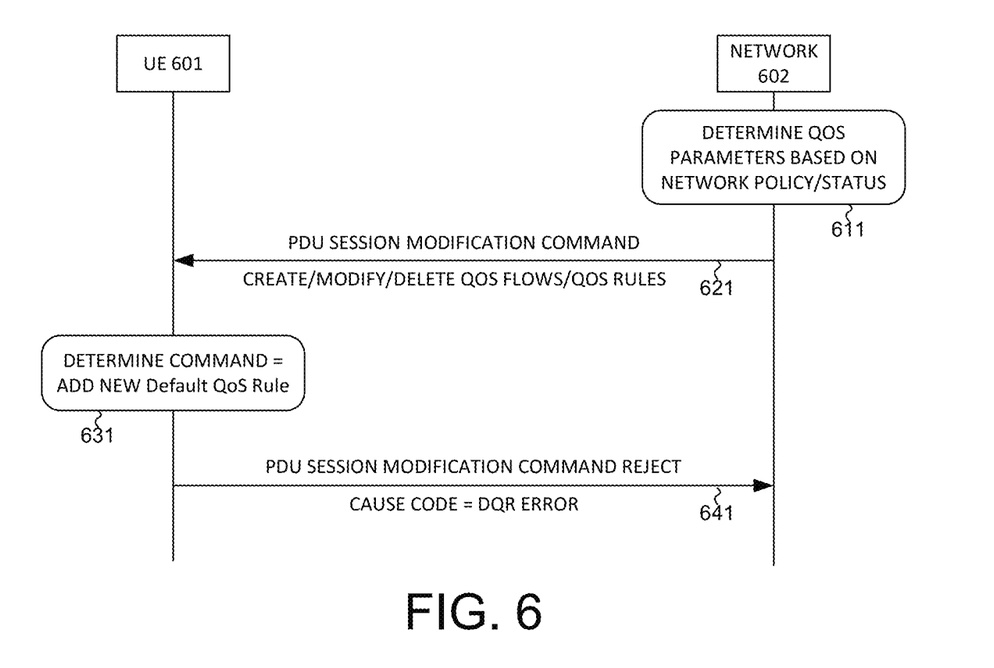
FIG. 6 illustrates a second embodiment of QoS rule management for PDU session modification procedure for adding default QoS rule in accordance with one novel aspect.

FIG. 6 illustrates a second embodiment of QoS rule management for PDU session modification procedure for adding default QoS rule in accordance with one novel aspect. FIG. 6 is similar to FIG. 5. In the embodiment of FIG. 6, however, the PDU session modification procedure is initiated by the network, not by the UE. In step 611, network 602 determines QoS parameters based on network policy and status. In step 621, network 602 sends a PDU session modification command to UE 601. In the embodiment of FIG. 6, the PDU session modification command comprises one or more new QoS rules with DQR indication set to "the QoS rule is the default QoS rule". In another embodiment of FIG. 6, the PDU session modification command comprises modifying the DQR indication of an existing QoS rule from "the QoS rule is not the default QoS rule" to "the QoS rule is the default QoS rule". In step 631, upon receive the PDU session modification command, UE 601 evaluates the command and checks whether such command causes any conflict of the default QoS rule policy. When UE determines the command carries a new QoS rule with the DQR indication set to "the QoS rule is the default QoS rule" or modifying the DQR indication of an existing QoS rule from "the QoS rule is not the default QoS rule" to "the QoS rule is the default QoS rule", UE knows that the command will create more than one default QoS rules and thus causes conflict. In step 641, UE 601 send a PDU session modification command reject back to the network, with a proper cause, e.g., semantic error in the QoS operation, DQR mismatch or DQR error to resolve the DQR conflict. In another embodiment of step 641, UE 501 send a PDU session release request to the network with a proper cause, e.g., semantic error in the QoS operation.

Figure 7:
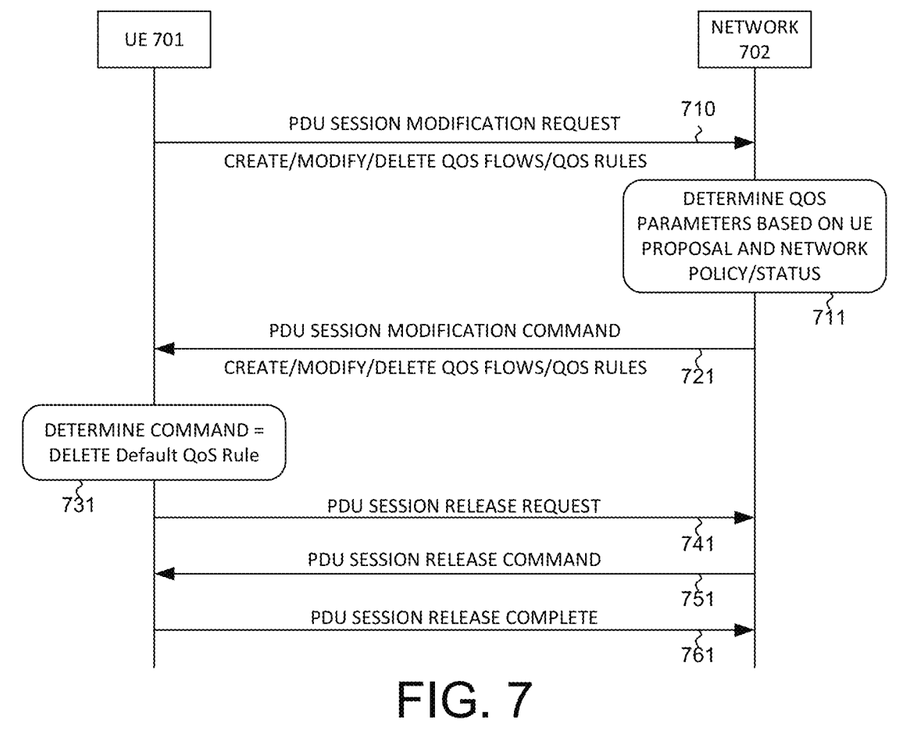
FIG. 7 illustrates a first embodiment of QoS rule management for PDU session modification procedure for deleting default QoS rule in accordance with one novel aspect.

FIG. 7 illustrates a first embodiment of QoS rule management for PDU session modification procedure for deleting the default QoS rule in accordance with one novel aspect. In step 710, UE 701 sends a PDU session modification request to data network 702. The PDU session modification request comprises UE proposals for creating, modifying, or deleting one or more QoS flows and/or one or more QoS rules. In step 711, network 702 determines QoS parameters based on the UE proposal and based on network policy and status. In step 721, network 702 sends a PDU session modification command to UE 701. In the embodiment of FIG. 7, the PDU session modification command comprises a QoS rule operation to delete the default QoS rule, to delete all packet filters within the default QoS rule, or to modify the default QoS rule to change the DQR setting (i.e., set the rule as not a default QoS rule). In step 731, upon receive the PDU session modification command, UE 701 evaluates the command and checks whether such command causes any conflict of the default QoS rule policy. When UE determines the command carries a QoS rule operation to effectively delete the existing default QoS rule, UE knows that the command causes conflict for the one and only one DRQ policy. In step 741, UE 701 send a PDU session release request to the network. In step 751, UE 701 receives a PDU session release command from the network. In step 761, UE 701 sends a PDU session release complete to the network. In another embodiment of step 741, UE 701 send a PDU session modification command reject back to the network, with a proper cause, e.g., semantic error in the QoS operation.

Figure 8:
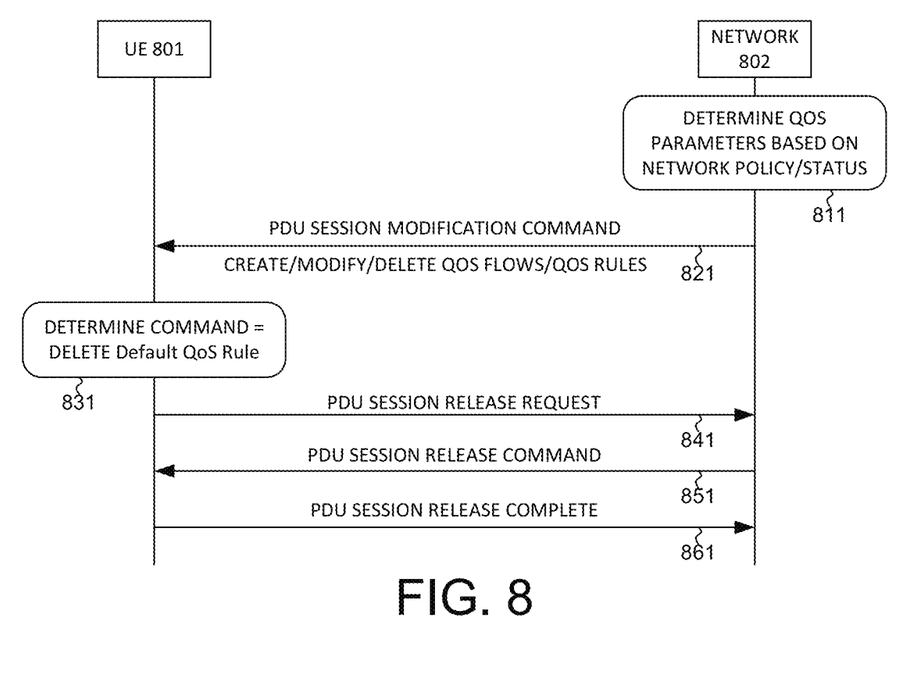
FIG. 8 illustrates a second embodiment of QoS rule management for PDU session modification procedure for deleting default QoS rule in accordance with one novel aspect.

FIG. 8 illustrates a second embodiment of QoS rule management for PDU session modification procedure for deleting default QoS rule in accordance with one novel aspect. FIG. 8 is similar to FIG. 7. In the embodiment of FIG. 8, however, the PDU session modification procedure is initiated by the network, not by the UE. In step 811, network 802 determines QoS parameters based on network policy and status. In step 821, network 802 sends a PDU session modification command to UE 801. In the embodiment of FIG. 8, the PDU session modification command comprises a QoS rule operation to delete the default QoS rule, to delete all packet filters within the default QoS rule, or to modify the default QoS rule to change the DQR setting (i.e., set the rule as not a default QoS rule). In step 831, upon receive the PDU session modification command, UE 801 evaluates the command and checks whether such command causes any conflict of the default QoS rule policy. When UE determines the command carries a QoS rule operation to effectively delete the existing default QoS rule, UE knows that the command causes conflict for the one and only one DRQ policy. In step 841, UE 801 send a PDU session release request to the network. In step 851, UE 801 receives a PDU session release command from the network. In step 861, UE 801 sends a PDU session release complete to the network. In another embodiment of step 841, UE 801 send a PDU session modification command reject back to the network, with a proper cause, e.g., semantic error in the QoS operation.

Figure 9:
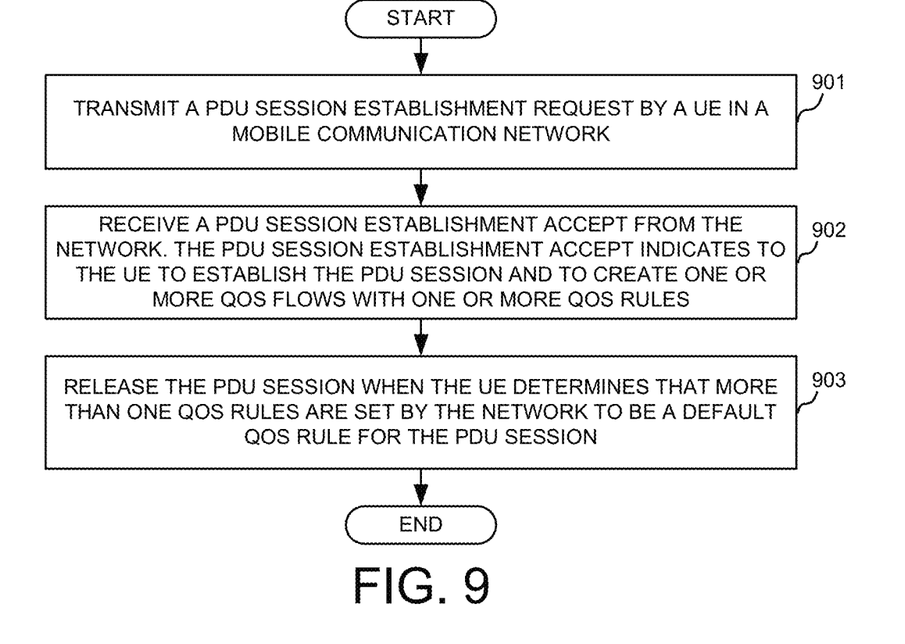
FIG. 9 is a flow chart of a method of QoS rule management for PDU session establishment in accordance with one novel aspect.

FIG. 9 is a flow chart of a method of QoS rule management for PDU session establishment in accordance with one novel aspect. In step 901, a UE transmits a protocol data unit (PDU) session establishment request in a mobile communication network. In step 902, the UE receives a PDU session establishment accept from the network. The PDU session establishment accept indicates to the UE to establish the PDU session and to create one or more QoS flows with one or more QoS rules. In step 903, the UE releases the PDU session when the UE determines that more than one QoS rules are set by the network to be a default QoS rule for the PDU session.

Figure 10:
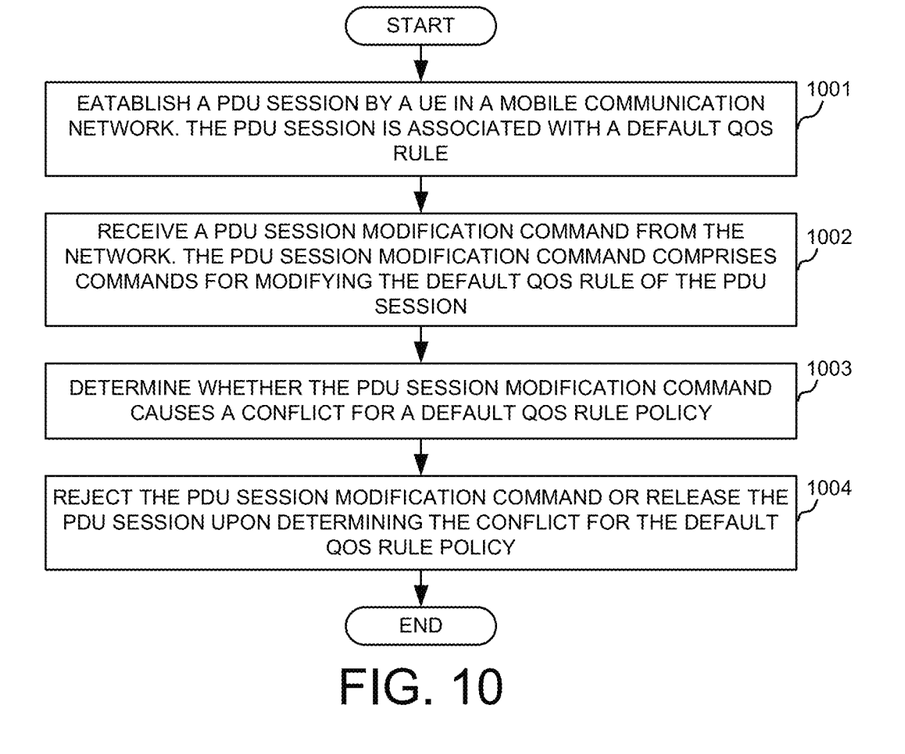
FIG. 10 is a flow chart of a method of QoS rule management for PDU session modification in accordance with one novel aspect.

FIG. 10 is a flow chart of a method of QoS rule management for PDU session modification in accordance with one novel aspect. In step 1001, a UE establishes a protocol data unit (PDU) session in a mobile communication network. The PDU session is associated with a default Quality of Service (QoS) rule. In step 1002, the UE receives a PDU session modification command from the network. The PDU session modification command comprises commands for modifying the default QoS rule of the PDU session. In step 1003, the UE determines whether the PDU session modification command causes a conflict for a default QoS rule policy. In step 1004, the UE rejects the PDU session modification command or releasing the PDU session upon determining the conflict for the default QoS rule policy. In one example, the PDU session modification command is for the UE to add another QoS rule as the default QoS rule. The UE rejects the PDU session modification command by sending a PDU session modification command reject message with an error code. In another example, the PDU session modification command is for the UE to delete the default QoS rule, to delete all packet filters within the default QoS rule, or to change the DQR setting. The UE release the PDU session by sending a PDU session release request.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   transmitting a protocol data unit (PDU) session establishment request message by a user equipment (UE) in a mobile communication network;
   receiving a PDU session establishment accept message from the network, wherein the PDU session establishment accept message indicates to the UE to establish the PDU session and to create one or more QoS flows with one or more QoS rules; and
   releasing the PDU session by the UE upon detecting a conflict for a default QoS rule policy caused by the PDU session establishment accept message, when the UE determines that the conflict is caused by more than one QoS rules are set by the network to be a default QoS rule for the PDU session during the creation of the one or more QoS flows with the one or more QoS rules, and wherein the PDU session is release explicitly by the UE sending a PDU session release request message with a corresponding cause "semantic error in the QoS operation" indicating the conflict to the network.

2. The method of claim 1, wherein the PDU session establishment request message is carried over non-access stratum (NAS) layer signaling.

3. The method of claim 2, wherein the PDU session establishment request message contains a unique PDU session ID generated by the UE.

4. The method of claim 1, wherein the PDU session establishment accept message is carried over non-access stratum (NAS) layer signaling.

5. The method of claim 4, wherein the PDU session establishment accept message contains PDU session parameters including the one or more QoS rules to be created.

6. The method of claim 1, wherein each QoS flow is identified by a QoS flow ID (QFI), and wherein each QoS rule is identified by a QoS Rule ID (QRI).

7. The method of claim 1, wherein PDU session establishment accept message carries an indication for each QoS rule indicating whether a QoS rule is the default QoS rule.

8. The method of claim 1, wherein the PDU session is released locally in the UE, and wherein the UE optionally initiates a registration update procedure with the network.

9. The method of claim 1, wherein the UE transmits a second PDU session establishment request message to the network for establishing a second PDU session.

10. A User Equipment (UE), comprising:
    a transmitter that transmits a protocol data unit (PDU) session establishment request message in a mobile communication network;
    a receiver that receives a PDU session establishment accept message from the network, wherein the PDU session establishment accept message indicates to the UE to establish the PDU session and to create one or more QoS flows with one or more QoS rules; and
    a PDU session handling circuit that releases the PDU session upon detecting a conflict for a default QoS rule policy caused by the PDU session establishment accept message, when the UE determines that the conflict is caused by more than one QoS rules are set by the network to be a default QoS rule for the PDU session during the creation of the one or more QoS flows with the one or more QoS rules, and wherein the PDU session is release explicitly by the UE sending a PDU session release request message with a corresponding cause "semantic error in the QoS operation" indicating the conflict to the network.

11. The UE of claim 10, wherein the PDU session establishment request message is carried over non-access stratum (NAS) layer signaling.

12. The UE of claim 11, wherein the PDU session establishment request message contains a unique PDU session ID generated by the UE.

13. The UE of claim 10, wherein the PDU session establishment accept message is carried over non-access stratum (NAS) layer signaling.

14. The UE of claim 13, wherein the PDU session establishment accept message contains PDU session parameters including the one or more QoS rules to be created.

15. The UE of claim 10, wherein each QoS flow is identified by a QoS flow ID (QFI), and wherein each QoS rule is identified by a QoS Rule ID (QRI).

16. The UE of claim 10, wherein PDU session establishment accept message carries an indication for each QoS rule indicating whether a QoS rule is the default QoS rule.

17. The UE of claim 10, wherein the PDU session is released locally in the UE, and wherein the UE optionally initiates a registration update procedure with the network.

18. The UE of claim 10, wherein the UE transmits a second PDU session establishment request message to the network for establishing a second PDU session.

* * * * *